United States Patent [19]

McGill

[11] 4,305,311

[45] Dec. 15, 1981

[54] CRANKSHAFT CONSTRUCTION

[75] Inventor: Kenneth H. McGill, Beaumont, Tex.

[73] Assignee: Dresser Industries, Inc., Dallas, Tex.

[21] Appl. No.: 908,024

[22] Filed: May 22, 1978

Related U.S. Application Data

[60] Continuation of Ser. No. 720,539, Sep. 7, 1976, abandoned, which is a division of Ser. No. 569,726, Apr. 21, 1975, abandoned.

[51] Int. Cl.³ .............................................. F16C 3/04
[52] U.S. Cl. ............................................ 74/595; 29/6
[58] Field of Search ............... 29/6; 74/597, 598, 603, 74/596, 595, 570

[56] References Cited

U.S. PATENT DOCUMENTS

| | | | |
|---|---|---|---|
| 1,282,631 | 10/1918 | Richter | 74/603 |
| 1,390,949 | 9/1921 | Yassenoff | 74/567 |
| 1,512,973 | 10/1924 | Bennett et al. | 74/597 |
| 1,550,832 | 8/1925 | Metcalfe | 74/570 |
| 1,575,239 | 3/1926 | Walker | 74/603 |
| 1,605,830 | 11/1926 | Garber et al. | 74/596 |
| 2,337,157 | 12/1943 | Finley et al. | 74/597 |
| 3,131,577 | 5/1964 | Wilson | 74/597 |
| 3,367,277 | 2/1968 | Andrews et al. | |
| 3,747,433 | 7/1973 | Crowe | 74/597 |

FOREIGN PATENT DOCUMENTS

| | | | |
|---|---|---|---|
| 608582 | 2/1933 | Fed. Rep. of Germany | 74/597 |
| 1057527 | 3/1954 | France | 74/603 |
| 5558 | of 1881 | United Kingdom | 74/597 |

OTHER PUBLICATIONS

Duplex Slush Pump MM-1450, Parts Book and Maintenance Manual, Bulletin No. BMM-1450-GB-65.

Primary Examiner—Kenneth Dorner
Attorney, Agent, or Firm—J. N. Hazelwood; W. R. Peoples

[57] ABSTRACT

A crankshaft and its method of manufacture involves a straight, one piece shaft, with eccentric journals and circular gear base pressed onto the shaft and secured thereto in proper angular orientation.

1 Claim, 9 Drawing Figures

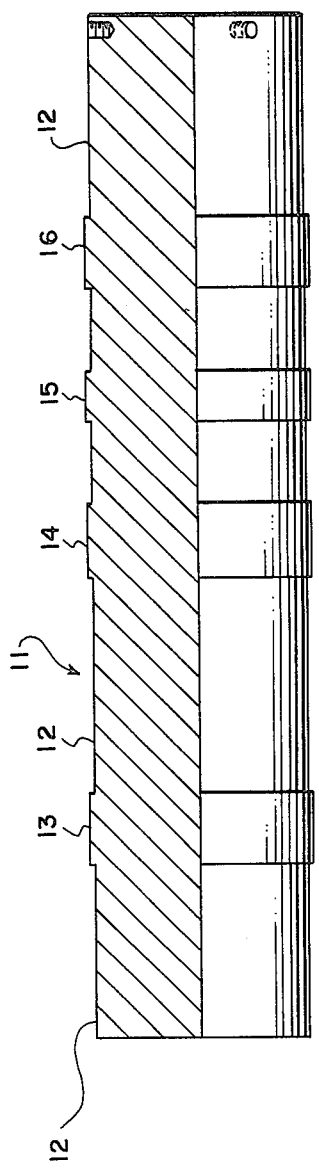
FIG. 1
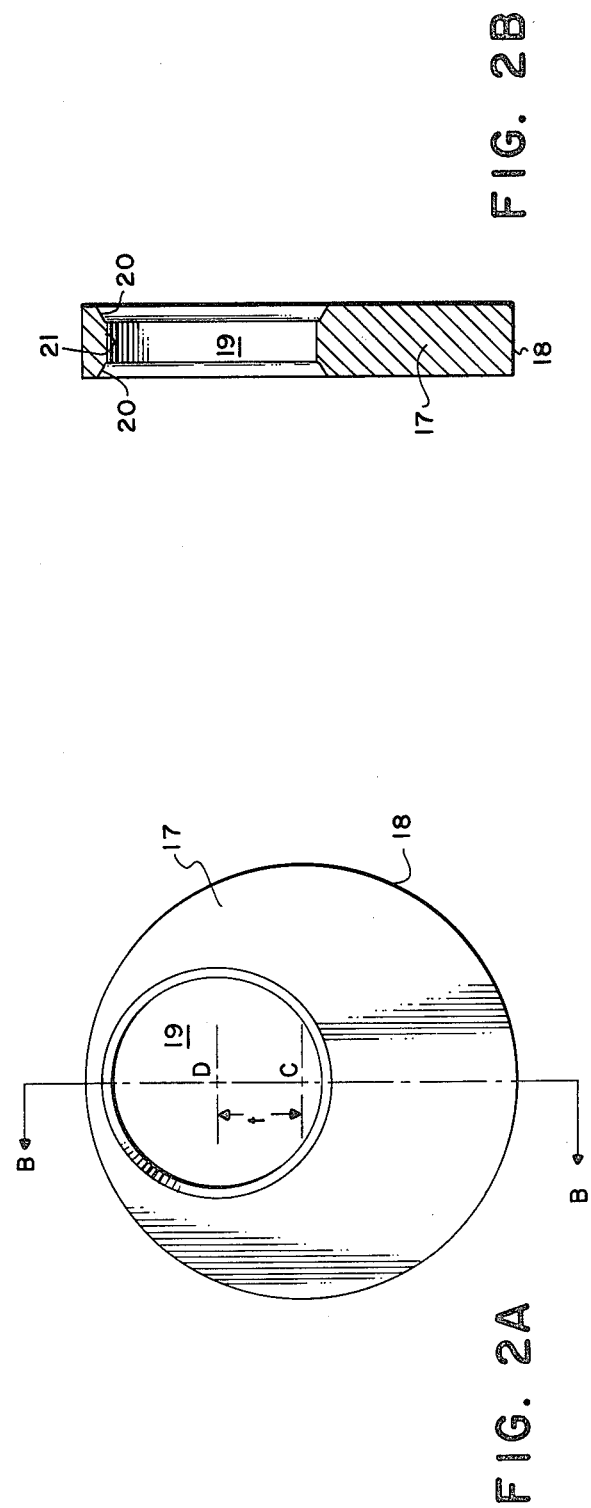
FIG. 2A
FIG. 2B

CRANKSHAFT CONSTRUCTION

This is a continuation of application Ser. No. 720,539, filed Sept. 7, 1976, now abandoned which was a division of Ser. No. 569,726, filed Apr. 21, 1975, now abandoned.

BACKGROUND OF THE INVENTION

In constructing machinery which must convert rotary motion into translinear motion or vice versa, for instance in such machines as internal combustion engines, compressors, and piston type pumps, the preferred configuration for such conversion of motion is the use of a linear driveshaft rotatably mounted in the machine and having one or more eccentric journals.

Connecting rods mounted on the eccentric journals by bearings and having pistons at the opposite ends thereof may be driven in a linear direction, for example in a cylinder, by rotation of the crankshaft eccentric journals.

Construction of crankshafts in the past have evolved from casting and/or forging of a single piece crankshaft having integral journals and webs formed thereon. Due to the complex geometry of such a shaft, arising from the webs, notches, and radiuses, the prediction of internal stresses in the shaft has been very unsuccessful, therefore the thickness of the shaft and journal areas in particular was greatly overdesigned to compensate for unknown stresses in the stress concentration areas.

Efforts have been made to fabricate a crankshaft by attaching the eccentric journals to the longitudinal shaft. These efforts involved attempts to duplicate the complex geometry of the cast one-piece crankshaft and as a result, made no improvement in the stress analysis problem. As a result, just as much material was used in these fabrications as is used in the cast shaft and the only gain was in the elimination of the casting step. Since the time involved in the complex fabrication process offset the advantage gained, this was never an economical method of manufacturing the crankshaft.

This invention discloses a crankshaft and its method of manufacture which greatly reduces the time of manufacture, allows a highly accurate stress analysis to be obtained, and greatly reduces the amount of excess material needed for strength. The invention involves a one-piece straight shaft upon which is pressed eccentric discs to act as journals.

BRIEF DESCRIPTION OF THE DRAWINGS

FIG. 1 is a partial cross-sectional lateral view of the straight shaft portion;

FIG. 2a shows a side axial view of an eccentric journal disc for use on the shaft of FIG. 1;

FIG. 2b illustrates a side cross-sectional view of the disc of FIG. 2a;

FIG. 3b is a side cross-sectional view of the gear plate of FIG. 3a;

FIG. 4b is an axial end view of the crankshaft of FIG. 4a;

DESCRIPTION OF THE PREFERRED EMBODIMENTS

Figure 3A:
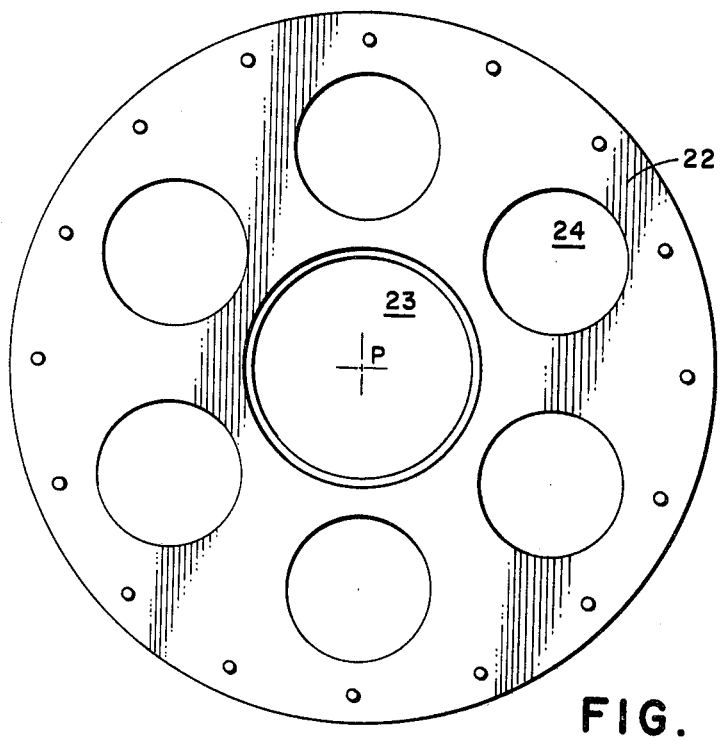
FIG. 3a illustrates an axial view of a gear plate to be used on the shaft of FIG. 1.

Referring to FIG. 1, a straight cylindrical shaft section 11 is formed from a section of standard bar stock or round forging made of an alloy such as 4130 steel. After the shaft section 11 has been cut from the bar stock containing the proper alloy, the section is cut roughly to length and preliminary machining is performed on the cylindrical surface to reduce the diameter in certain portions 12 while slightly raised shoulder areas 13 through 16 are retained on the shaft section. These raised shoulder areas 13-16 are located completely around the periphery of the shaft section 11. The shaft section 11 is primarily designed to be fabricated into a crankshaft for a triplex mud pump, although the principles and techniques involved and herein described in this process could be utilized for the manufacture of other types of crankshafts having one or more journals thereon.

Referring now to FIGS. 2a and 2b, the construction of a typical crankshaft journal to be utilized on shaft section 11 is disclosed. In FIG. 2a, a generally circular journal disc 17 may be formed from a section of mild steel plate such as A36 having the appropriate thickness. Disc 17 may be cut from the plate by any available or convenient means such as flame cutting or machining. The disc is machined to have a cylindrical outer periphery 18 with a center located at C. A circular opening 19 for receiving one of the raised shoulder portions 13-16 of shaft section 11 is cut in disc 17 with the center D of opening 19 being radially displaced a predetermined distance T, which distance T determines the throw or stroke of the crankshaft journal.

FIG. 2b illustrates a side cross-sectional view of disc 17 through the center points C and D as shown by section line B—B in FIG. 2a. In FIG. 2b it is shown how radiused bevelled shoulders 20 are formed in the outer circumferential edges of opening 19, which bevelling of faces 20 serves to form a raised inner shoulder area 21 in opening 19. The bevelling of the edges of opening 19 facilitates pressing of the journal disc upon the crankshaft section 11 and allows a channel for welding of the discs to the shoulder areas 13 through 16. It should be noted that the thickness of the plate from which the journal discs are formed is selected to be substantially the same thickness as the width of the raised shoulders 13 through 16. It is clear to see that the width of shoulders 13 through 16 could be varied during the machining process to match any available plate thickness. Also it may be preferable to machine openings 19 with a diameter slightly smaller than the outer diameter of the shaft section upon which the disc is to be placed. This provides an interference fit between the disc and its associated shoulder and requires a certain amount of force usually applied by hydraulic press means to place the disc in proper location on the shoulder. This press fit of each journal disc upon the shaft shoulder further strengthens the final crankshaft design and facilitates construction of the crankshaft.

Figure 3B:
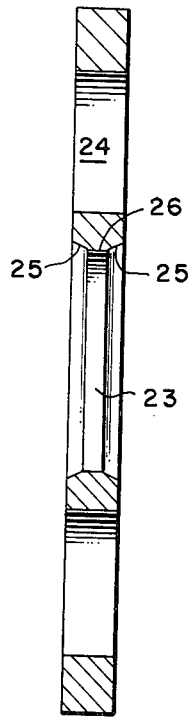

FIGS. 3a and 3b illustrate a typical construction of a gear plate 22 for location on shaft section 11, preferably in a pressed fit relationship on shoulder 15. The construction of gear plate 22 is similar to that of the journal disc 17. The circular plate 22 is cut from a section of steel plate and is formed in a circular disc having a center at P. The disc 22 has a circular opening 23 to receive shoulder 15 of shaft section 11. The shaft opening 23 is centrally located on gear disc 22 and has a center corresponding to the center P of disc 22. A number of circular work openings 24 may be cut through the disc surface at a location radially outward from opening 23. These openings are primarily for convenience of manufacture but also serve to lighten the crankshaft construction without sacrificing strength. Shaft opening 23 is characterized by having inner bevelled shoulders 25 formed at each outer edge of opening 23, which bevelled faces 25 form a radially inwardly projecting annular shoulder section 26. The diameter of opening 23 is preferably slightly smaller than the outer diameter of raised shoulder portion 15 so that an interference fit is obtained between gear disc 22 and the shaft when the disc is pressed onto shoulder 15. It should also be noted that the diameter of the outer shoulders 13 and 16 is a measurable amount smaller than the diameter of the inward shoulders 14 and 15 so that the inner discs on shoulders 14 and 15 may be passed over the shoulders 13 and 16 without interference. Preferably, the inner diameter of the shaft openings of the discs to be placed on shoulders 14 and 15 will be larger than the diameter of shoulders 13 and 16 but smaller than the diameter of the shoulder upon which the disc will be pressed.

Figure 4A:
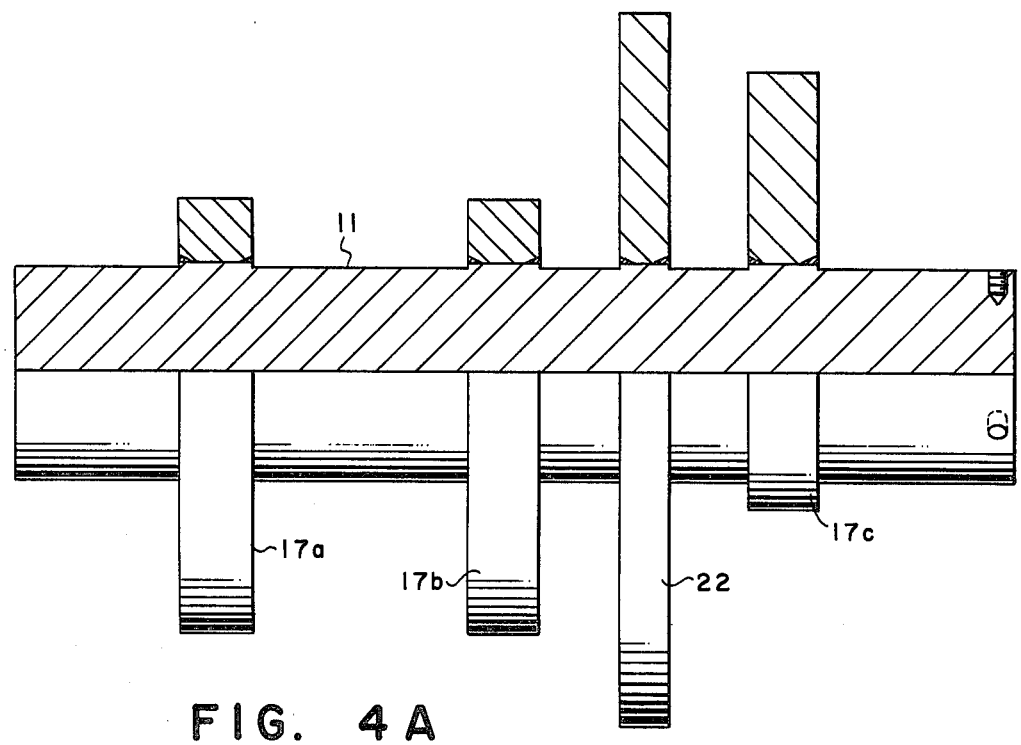
FIG. 4a is a partial cross-sectional lateral view of a crankshaft for a triplex pump prior to the final machining operations.
Figure 4B:
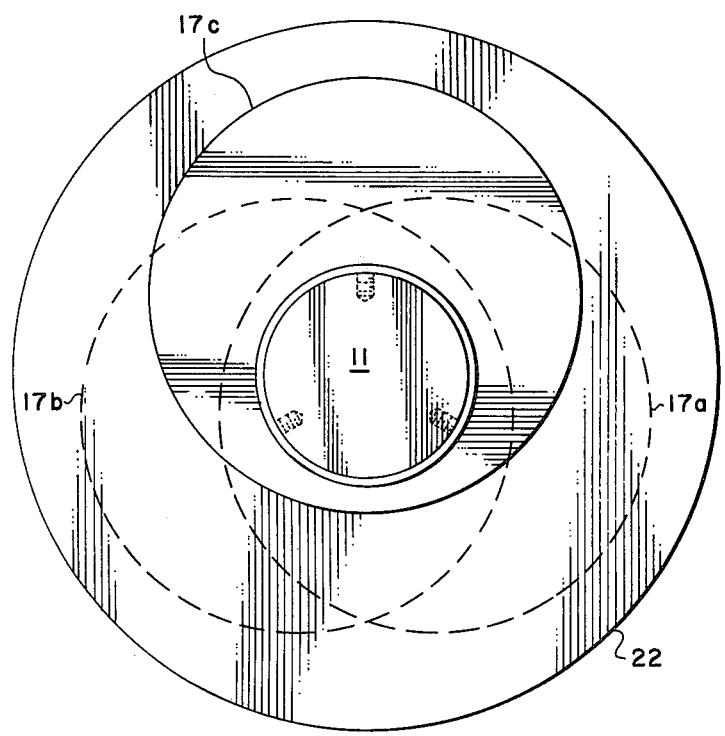

Referring now to FIGS. 4a and 4b, the preliminary crankshaft configuration is illustrated in partial cross-section wherein the three journal discs 17a, 17b, and 17c and the gear plate 22 have all been pressed onto their respective raised shoulder sections on shaft section 11. In FIG. 4b, the location of the eccentric discs on the shaft and the orientation of the eccentricity of each journal disc 17 with respect to the other journal discs is shown. For a triplex mode of operation, it is usually preferable to orient the journals such that their high points of eccentricity are each located 120° from the other.

FIG. 4b illustrates one preferable placement of the eccentric journal discs 17a, b, and c on the shaft 11. Two of the journal discs are shown in phantom in this axial end view. The gear disc 22, of course having the shaft opening centrally located therein, will exhibit no eccentricity about the shaft 11. The channels formed by the bevelled faces of the shaft openings in each of the discs have been filled by weld material W which weld serves to anchor each disc upon its respective shaft shoulder.

Figure 5:
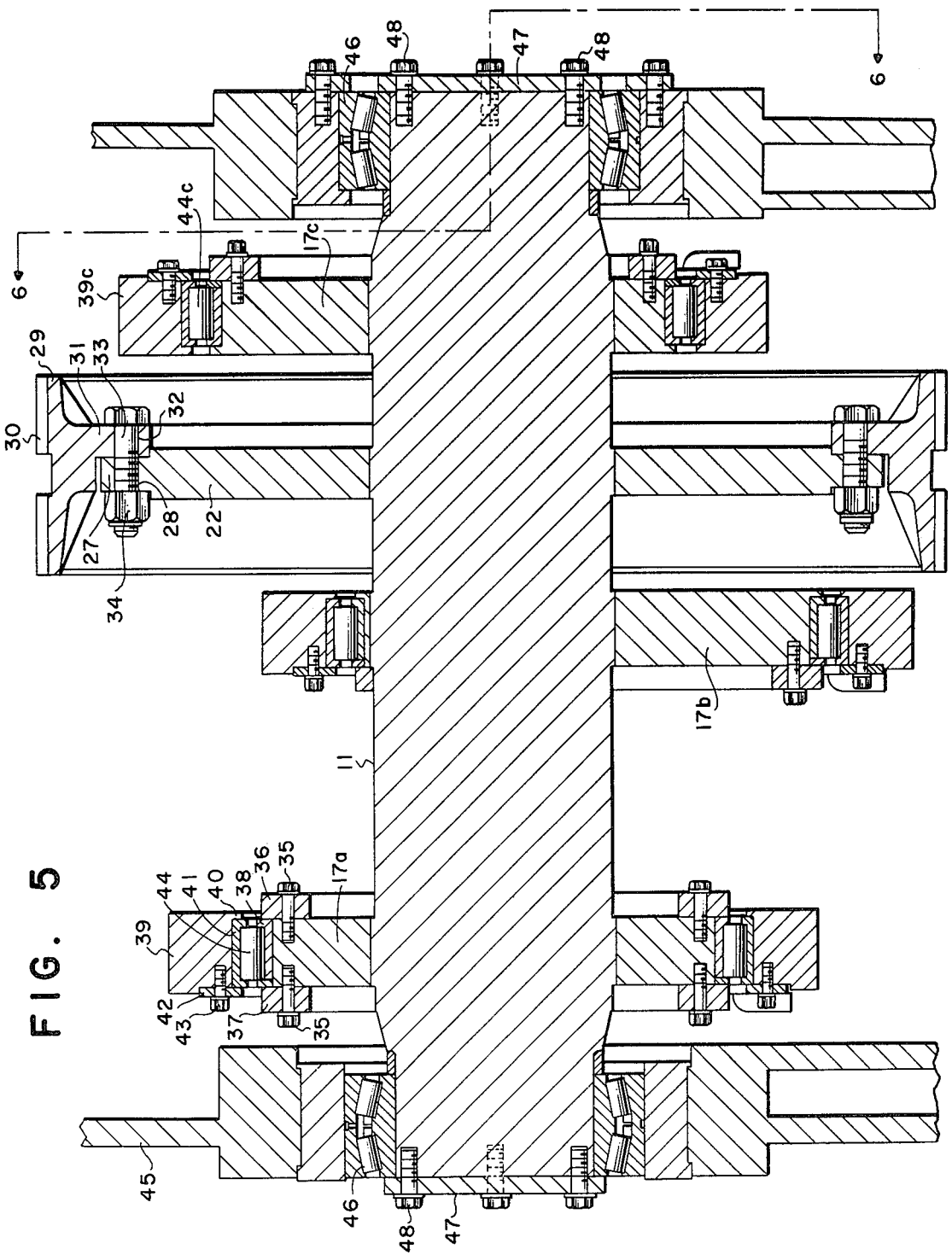
FIG. 5 is a full cross-sectional lateral view of the finished triplex crankshaft; and, FIG. 6 is a partial cross-sectional axial end view of the crankshaft of FIG. 5 taken at line 6—6 in FIG. 5.
Figure 6:
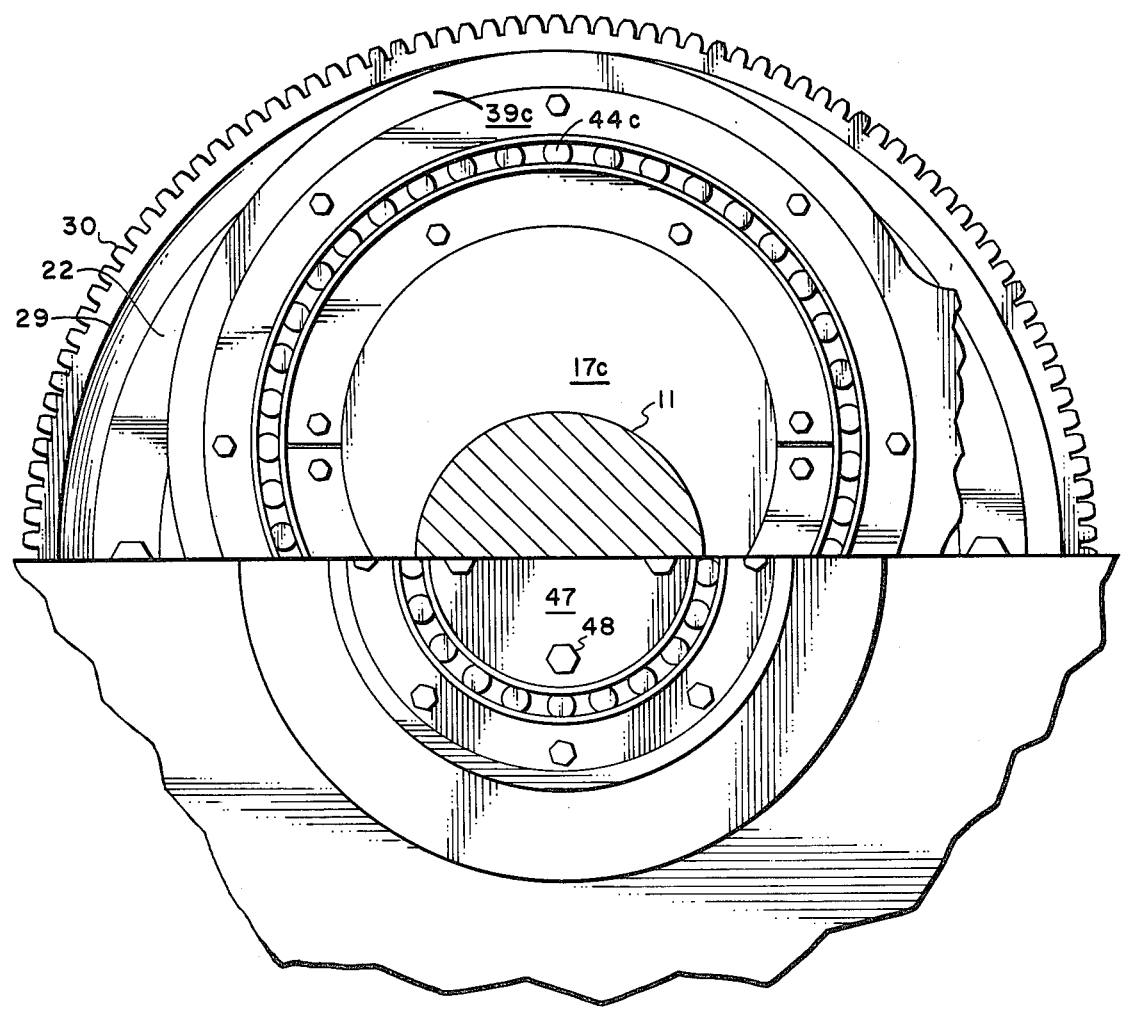

Referring now to FIG. 5 and FIG. 6, the final crankshaft configuration is illustrated assembled in the triplex pump with the pump components shown in their operative relationship with the crankshaft. In the final crankshaft configuration of FIG. 5, the gear disc 22 is shown having a portion of each face machined in an annular area near the outer periphery thereof which machined area from each face forms a narrowed outer annular flange section 27 through which are drilled a number of bolt holes 28. A circular annular gear ring 29, having a plurality of external gear teeth formed around the outer periphery thereof, and an inwardly projecting annular flange 31 projecting radially inward, is attached to gear disc 22. Inward flange 31 has a plurality of bolt holes 32 passing therethrough arranged for alignment with bolt holes 28. Also, the inner diameter of flange 31 preferably closely matches the inner diameter of section 27 on disc 22. This allows abutment of flange 31 into the recessed machined area forming shoulder 27. An alignment of holes 28 with holes 32 allows bolts 33 to be placed therethrough and secured by threaded nuts 34, which bolting operation ridgedly and securely attaches gear ring 29 to gear plate 22.

Location of gear plate 22 on shaft 11 provides a means for driving the crankshaft via gear teeth 30, which crankshaft in turn, by means of the eccentric journals 17, drives connecting rods located thereon. The connecting rods have pump pistons attached thereto at their other ends. The configuration of the eccentric journals and the attachment of the connecting rods thereto is substantially identical for each of the journals, therefore description of only one journal will be given since this is typical of the other journal construction.

In FIG. 5, the journal disc 17a on shaft 11 has attached thereto by means of threaded bolts 35 threadedly engaged within internally threaded openings machined into the outer area of disc 17a, a pair of opposed bearing clamping rings 36 and 37. These rings serve to clamp in place an inner bearing race 38 onto the outer periphery of disc 17a. A connecting rod having a generally circular end 39 is located around disc 17a in an encircling relationship thereabout. Connecting rod end 39 has an inwardly projecting shoulder 40 along one surface thereof adapted for abutting engagement with an outer bearing race 41. A circular retainer ring 42 is threadedly attached to connecting rod end 39 by means of threaded bolts 43 projecting therethrough and threadedly engaged in connecting rod end 39.

The coaction of ring 42 and shoulder 40 serves to clamp the outer bearing race 41 into secure position within connecting rod end 39. Located in rotatable relationship between bearing races 38 and 41 are a plurality of cylindrical roller bearings 44. The crankshaft 11 is rotatably mounted at each end thereof in the housing 45 of the triplex pump by means of roller bearing assemblies 46, which bearing assemblies are clamped to the crankshaft by means of end plates 47 attached thereto by a plurality of threaded bolts 48.

FIG. 6 illustrates a partial cross-sectional axial end view of the finished crankshaft connecting rod assembly. In FIG. 6, the location of an eccentric journal 17c is shown with respect to shaft 11 as is the location of gear ring 29 on gear plate 22. A connecting rod end 39c is rotatably mounted on eccentric journal disc 17c by means of a plurality of captive roller bearings 44c. In operation of the crankshaft assembly within the triplex pump, rotational motion is obtained in the crankshaft by the application of force thereto through the ring gear 29 and gear disc 22. The shaft is rotatably held within the pump housing by bearings 46 and, as a result of the forces on gear 22, will be made to rotate within bearings 46. The rotation of the shaft rotates the eccentric journals 17 to which are rotatably connected by means of bearings 44, the circular connecting rod ends. The eccentric motion obtained by rotation of the eccentric journals 17 reciprocates the connecting rod in the pump housing, resulting in a translinear motion of the pump pistons connected to the rods. This translinear motion of the pistons provides the pumping function for the assembly.

Thus, it can be seen from the description above that the construction of the crankshaft of this invention is relatively uncomplicated but provides a crankshaft configuration exhibiting maximum strength and minimum stress concentrations. During design of the crankshaft, the parameters are maintained at a minimum and stress analysis of the shaft is very simple to obtain. This is done by computing and/or empirically measuring the stress within the simple cylindrical shaft section 11 and by computing the stresses arising due to the torsion acting on the journal discs.

The pressed fit between the discs and the shaft serves to relieve the welds therebetween from all stresses in the shaft except torsion. After the discs have been pressed on the shaft, it is preferable that the shaft be heated to a range of approximately 500° F. and then the weldng done at this temperature. After welding, the shaft and discs may be heated to approximately 600° F. then slowly cooled. Thereafter, any warped areas due to the welding may be stress relieved by heating the crankshaft to approximately 1200° F. and held there for a period of time such as 8 hours. After stress relief, the final machining, which takes the shaft from the configuration of FIGS. 4a and 4b to the final configuration of FIG. 5, is performed.

The entire crankshaft may be constructed without the need for any casting steps. All of the components of the shaft are simple and uncomplicated and may be easily formed from the most basic standard materials such as forged bar and steel plate. The resulting crankshaft is lighter, is more economical to build, and yet it stronger than the comparable previous devices.

Although certain preferred embodiments of the invention have been herein described in order to provide an understanding of the general principles of the invention, it will be appreciated that various changes and innovations can be affected in the described crankshaft without departing from these principles. For example, whereas bar stock and steel plate have been described as basic construction materials, it is obvious that suitable materials available in any other basic shapes or configurations can be utilized. For instance, the cylindrical shaft section may be a cast cylindrical shape or it may be forged. Likewise, it is clear that instead of forming journal discs by cutting the circular sections from flat plate, the circular sections could be obtained by cutting them from a large diameter rod. Also the shaft 11 could be constructed as a smooth cylindrical shaft without utilizing the raised shoulders 13 through 16. These shoulders are provided primarily for ease of construction. When the interference fit is desired between the journal discs and the shaft, it is much easier to make the majority of the shaft smaller than the journal area so that the journal disc may be easily slid onto the shaft to the area where the press fit is needed but it is possible to do away with the raised shoulders by pressing each of the discs down the length of the shaft.

Furthermore, modification of the attachment of the discs to the shaft would involve such methods as keyed joints by forming keyways in the shaft and the disc and using key inserts therein. The invention, therefore, is declared to cover all changes and modifications of the specific example of the invention herein disclosed for purposes of illustration, which do not constitute departures from the spirit and scope of the invention.

The embodiments of the invention in which an exclusive property or privilege is claimed are defined as follows:

1. In a reciprocating piston triplex mud pump having three connecting rods mounted with a crankshaft, and improvement in the crankshaft thereof, comprising
   a. an elongated cross-sectional circular shaft;
   b. first, second and third circular journal discs rigidly mounted on said shaft in a spaced relation, each of said journal discs having a mounting opening therethrough which is offset from the geometric center of the respective journal disc such that each of the respective mounting openings is within the perimeter of the respective journal disc such that said journal discs are eccentrically mounted on said shaft; said journal discs having crankshaft mounting end portions of said connecting rods rotatably mounted around the outer periphery thereof;
   c. a fourth substantially flat circular disc is rigidly mounted directly to said shaft between two of said journal discs and having a mounting opening through the center thereof such that said disc is substantially concentrically mounted on said shaft;
   d. an annular drive gear rigidly mounted around the outer peripheral portion of said fourth disc with said gear having teeth around the outer periphery thereof adapted for operable engagement with a source of rotative power in order to operably rotate said crankshaft; and
   e. said shaft, having a plurality of radially enlarged peripheral portions therearound at spaced intervals along the length thereof with said discs being mounted on said shaft at said enlarged peripheral portions.

* * * * *